Oct. 11, 1966  H. J. DONALD  3,278,666
METHOD OF FORMING A BLOW MOLDED OBJECT
Filed July 17, 1963  3 Sheets-Sheet 1
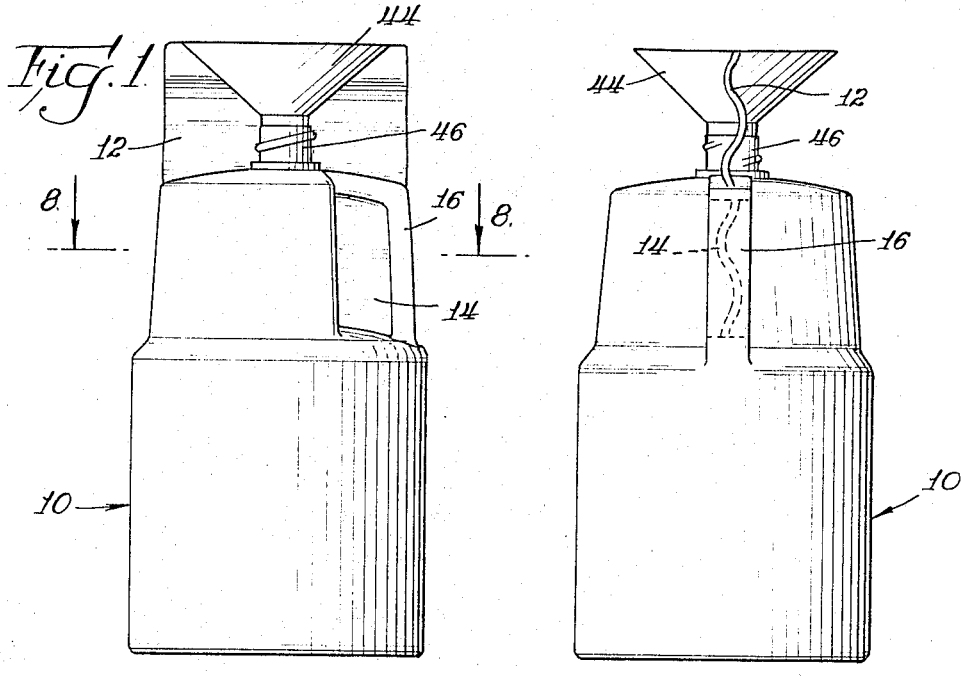
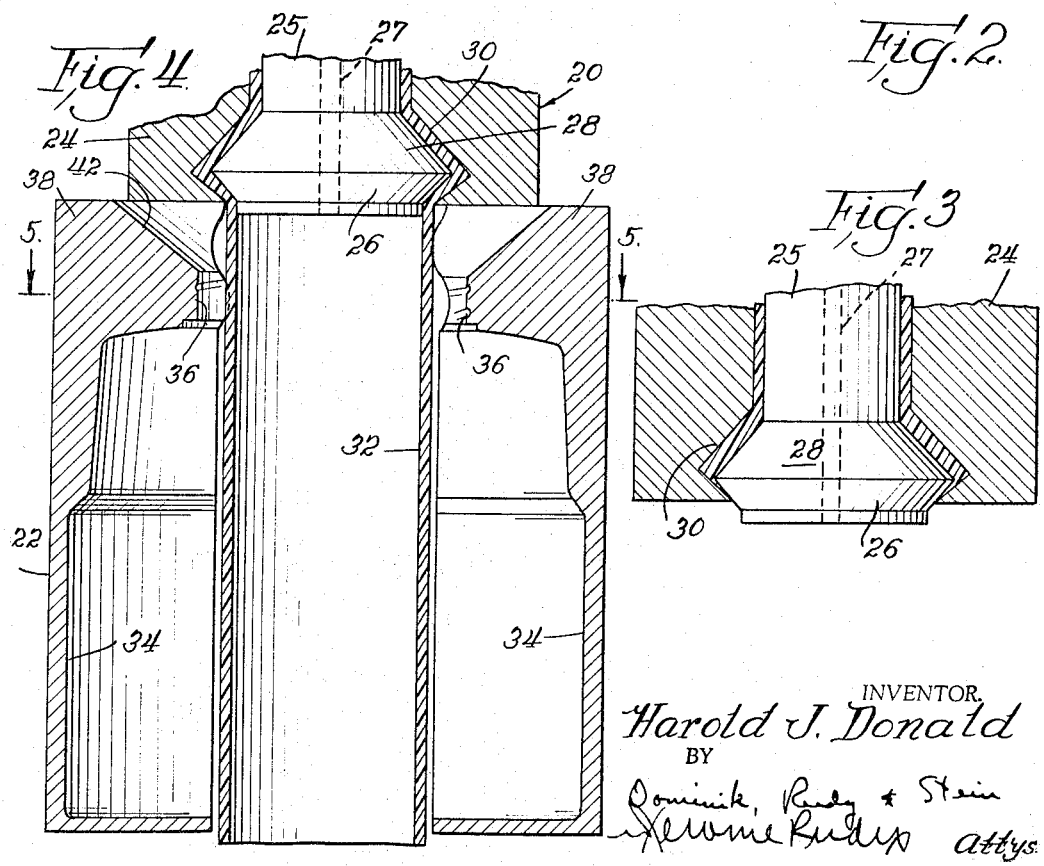
INVENTOR.
Harold J. Donald
BY
Dominik, Knudy & Stein
Jerome Knudy  attys.

Oct. 11, 1966  H. J. DONALD  3,278,666
METHOD OF FORMING A BLOW MOLDED OBJECT
Filed July 17, 1963  3 Sheets-Sheet 2
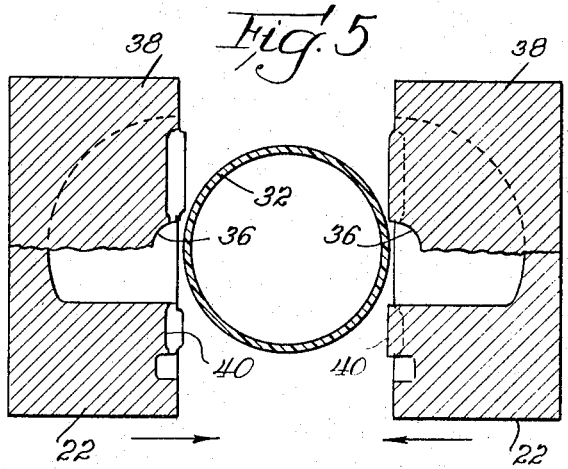
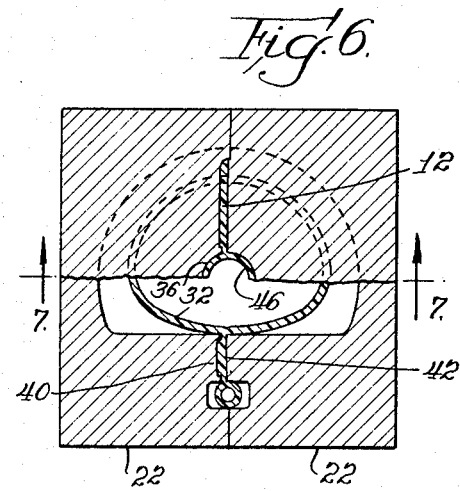
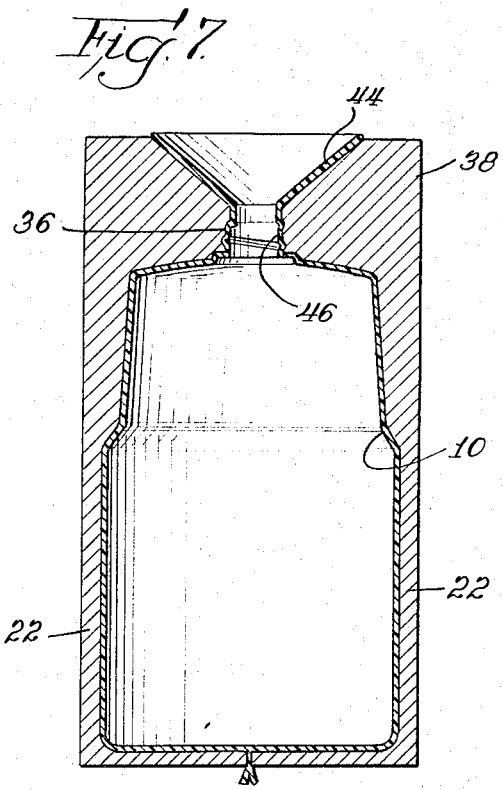
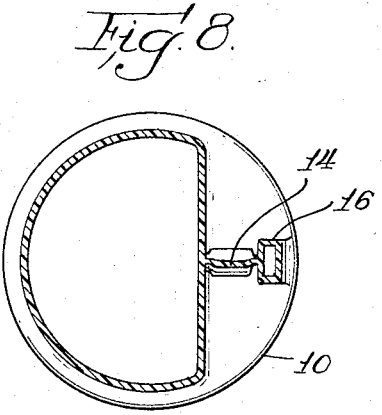
INVENTOR.
Harold J. Donald
BY
Dominik, Rudy & Stein
Jerome Rudy  attys.

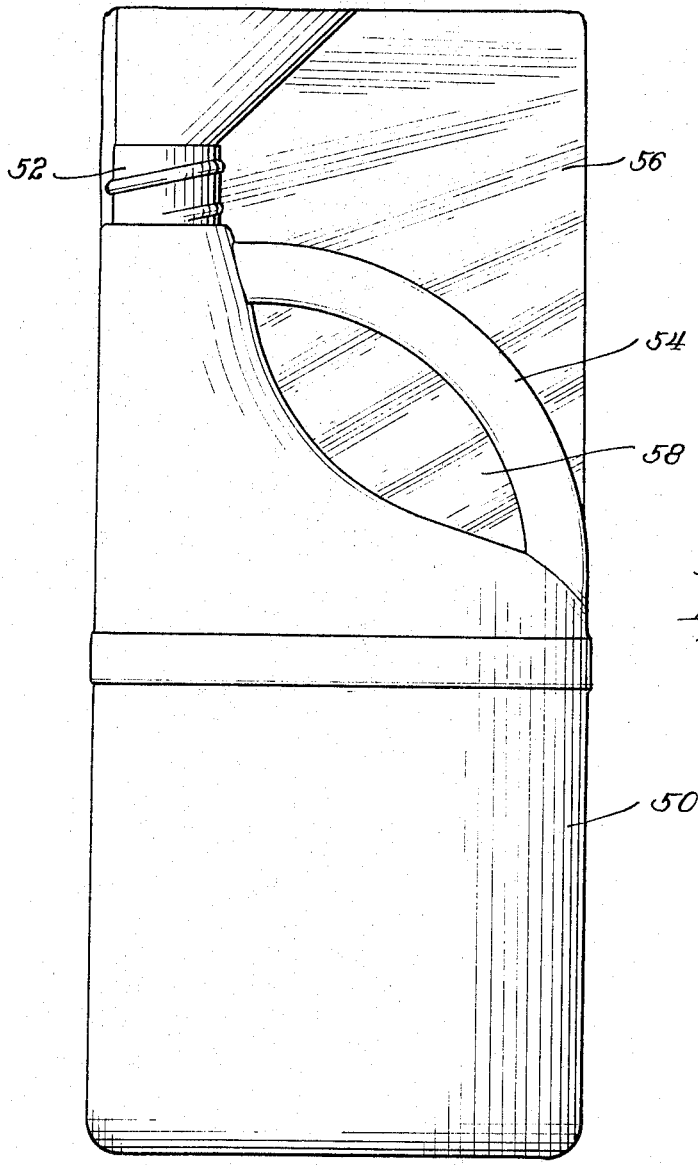

United States Patent Office 3,278,666
Patented Oct. 11, 1966

3,278,666
METHOD OF FORMING A BLOW MOLDED OBJECT
Harold J. Donald, Midland, Mich., assignor to The Dow Chemical Company, Midland, Mich., a corporation of Delaware
Filed July 17, 1963, Ser. No. 295,675
3 Claims. (Cl. 264—98)

This invention relates to a method of forming a blow molded object, and more particularly to a method of forming a blow molded bottle free from warpage as may be caused by unbalanced stresses developed during cooling.

The problem of warpage in blow molded bottles may not be as serious in bottles of uncomplicated shapes, that is, bottles which are of uniform cross-section throughout the entire periphery. However, in bottles having offset neck portions, with or without integral handles, or such non-uniform material distribution, the problem of warpage can be serious, primarily because of an unbalance of stress resulting from shrinkage of scrap trim portions.

The principles of the present invention may be used to fabricate blow molded bottles having integral handle portions wherein warpage is avoided in the finished bottle. Briefly, the inventive concept involves the provision of corrugated scrap trim portions on the blow molded bottle which corrugated portions relieve stresses caused by contraction of the trim portions during cooling. In such manner, warpage of the finished bottle is avoided, especially in the neck and/or handle regions of the bottle. As will be seen hereinafter, the principles of the invention will especially be applicable in the formation of containers, including bottles, wherein a neck portion is offset, that is, in non-axial position.

The main object of this invention is to provide an improved method of forming blow molded containers.

A more specific object is to provide a method of forming a blow molded container wherein unbalanced stresses developed during cooling are relieved.

Another specific object is to provide a method for forming a blow molded container having an integral handle portion wherein warpage is avoided in the handle and/or neck portion.

Still another object of the invention is to provide a method of making wherein the neck portion of the bottle is offset, i.e., in non-axial position.

These and further objects and features of the invention will become more apparent from the following description and accompanying drawings wherein:

FIG. 1 is a side elevation view of a blown plastic container made in accordance with the invention and prior to trimming for removal of excess material;

FIG. 2 is a side elevation view ninety degrees removed from the FIG. 1 view;

FIG. 3 is a vertical section view of an injection orifice arrangement used in the formation of an open bottom parison from which the container of FIG. 1 is made;

FIG. 4 is a vertical section view showing a split-type mold used in the formation of the container of FIG. 1, and showing the mold halves in open position;

FIG. 5 is a cross-section view generally as seen along line 5—5 in FIG. 4;

FIG. 6 is the same but showing the mold halves in closed condition;

FIG. 7 is a vertical section view similar to FIG. 4, but showing the mold halves in closed position and after a container blowing operation;

FIG. 8 is a section view generally as seen along line 8—8 in FIG. 1; and

FIG. 9 is a side elevation view of another embodiment of a blown plastic container made in accordance with the principles of the invention, wherein a neck portion is non-axially arranged.

Referring now to the drawings, an untrimmed blown bottle or container 10 is shown in FIGS. 1 and 2, having corrugated trim scrap portions 12 and 14, formed in accordance with the principles of the invention, which scrap portions are subsequently removed in a finishing operation. The bottle, which may be made from polyethylene, polystyrene, or any other suitable plastic material, has an integral handle 16, which is generally hollow and is formed during the pinching and blowing of a parison 18, as will be more apparent hereinafter.

Apparatus for fabrication of the bottle 10 is shown in FIGS. 3 to 7, inclusive, and includes an extruding nozzle assemblage 20, and a pair of symmetrical half molds 22. The nozzle assemblage, which forms the delivery end of a plastic extruder, (not shown), includes a nose piece 24, and a reciprocable valve 25 which is centrally disposed in the nose piece, and which as an air flow passageway 27. The valve 25 has a head, in the form of two frusto-conical portions 26 and 28, which is in spaced relation to a cavity 30 formed in the nose piece. In open position of the valve, as seen in FIG. 4, flowable plastic material will be extruded in the form of an open end tube, or parison 32; in closed position of the valve, as seen in FIG. 3, the head portion 26 will abut the opening of the cavity 30 to restrict flow of plastic from the extruder and simultaneously sever the upper end of the tube 32.

The half molds 22 are each fashioned to form one half of a blown bottle and comprise a main body cavity 34, and a reduced diameter threaded neck portion 36, located at an upper end portion 38 of the molds. To form the handle 16, each of the mold halves has an island portion 40 which projects into the main body cavity 34, as best seen in FIG. 4, and which collapses the tube 32 to form the trim scrap 14. The inside end surface of each island portion 40 has an undulating curve to provide the corrugated, or wavy configuration, of the trim scrap 14, as indicated in dotted lines in FIG. 2. The upper end portion 38 is formed with a funnel-like portion, or configuration 42, and adjacent thereto the mating halves of each mold 22 have an undulating curve formed to provide the corrugated, or wavy configuration, of the trim scrap 12 as best seen in FIG. 2.

As will be seen in FIG. 1, a blown bottle made in the mold halves 22 will have a funnel 44 formed by the mold portions 42, as well as a threaded neck 46 formed by the mold neck portions 36, the parts 44 and 46 having the trim scrap 12 attached thereto. Also, the handle 16 will have the corrugated trim scrap portion 14 formed by the curved surface of the island portions 40.

The corrugated trim scrap portions 12 and 14 provide a bellows action which relieves the stresses due to contraction of the bottle during cooling, and thus avoids warpage of the bottle in the neck and handle portions, a condition which is frequently encountered in blow molding similar bottles in molds which do not provide for corrugated trim scrap portions.

The steps in molding bottles made in accordance with the principles of the invention, should be apparent from an understanding of the above description. Briefly, the tube 32 is extruded between the open mold halves 22, tube extrusion is terminated, the mold halves are closed, thus pinch closing the lower open end of the tube and simultaneously squeezing the tube to form the trim scrap portions 12 and 14, and finally, admitting compressed air into the tube via the passageway 27 to blow or expand the tube into full engagement with the interior walls of the molds.

It will be observed that the undulating curved surfaces of the mold halves provide a corrugated or wavy parting line on the inner peripheral surface of the handle 16, as well as in the region of the neck 46. Such a detail structure can serve to provide added strength to the bottle in said regions, since a non-linear parting line affords more resistance against sheer strain applied along the longitudinal direction of the parting line.

A container 50 shown in FIG. 9 is similar to the container 10; however, a neck portion 52 of the container 50 is non-axial, that is, it is offset toward one side of the container. An integral handle portion 54 adjoins the neck portion 52 and extends substantially to the opposite side of the bottle. A scrap trim portion 56 affixed to the neck portion 52 and the exterior of the handle portion 54 has a corrugated surface 58 which allows shrinkage of the scrap portion during cooling without generating unbalanced stress in the neck portion. In such manner, warpage of the offset neck portion is avoided.

It will be seen that the principles of the invention operate to allow shrinkage of large scrap trim areas without adversely affecting adjacent portions of the plastic container, that is, without causing warpage of a neck, or handle portion, for example.

From the foregoing, it will be seen that the blown bottles made in accordance with the principles of the invention will satisfy all of the objectives as set forth hereinbefore. While only one handle has been shown on the bottle above described for illustration of the principles of the invention, it will be understood that a bottle having more than one handle can be satisfactorily made utilizing said principles. It should be further understood that while a handle has been specifically mentioned, the principles of the invention may be successfully applied in the formation of any bottle having an integral protuberance, or non-symmetrical region forming a part of the bottle.

The foregoing description has been given in detail without thought of limitation since the inventive principles involved are capable of assuming other forms without departing from the spirit of the invention or the scope of the following claims.

What is claimed is:

1. A method of making a blow molded bottle having a reduced diameter neck portion including the steps of extruding a parison, surrounding the parison with a mold having cavity spaces capable of producing corrugated trim scrap portions capable of relieving stresses due to contraction of the bottle during cooling, generating a pressure differential on the extruded parison to shape the bottle, and cooling the bottle.

2. A method of making a blow molded bottle having a reduced diameter neck portion including the steps of extruding a parison, surrounding the parison with a mold, pinching the end of the parison closed, squeezing a region of the parison to form a corrugated scrap portion contiguous with the neck portion capable of relieving stresses due to contracting of the bottle during cooling, generating a pressure differential on the extruded parison to shape the bottle, and cooling the bottle.

3. A method of making a blow molded container having a reduced diameter neck portion and an integral handle portion including the steps of extruding a parison, surrounding the parison with a mold having cavity spaces capable of producing corrugated trim scrap portions within the handle portion and contiguous with the neck portion, generating a pressure differential on the extruded parison to shape the bottle, and cooling the bottle.

References Cited by the Examiner

UNITED STATES PATENTS

| | | | |
|---|---|---|---|
| 3,007,594 | 11/1961 | Wallace | 215—1 |
| 3,043,461 | 7/1962 | Glassco | 215—1 |
| 3,080,614 | 3/1963 | Adams. | |
| 3,082,484 | 3/1963 | Sherman. | |
| 3,120,679 | 2/1964 | Price et al. | 264—98 |

FOREIGN PATENTS 752,637   7/1956   Great Britain.

ROBERT F. WHITE, *Primary Examiner.*

MORRIS LIEBMAN, *Examiner.*

M. ROSEN, A. R. NOE, *Assistant Examiners.*